(12) United States Patent
Hall et al.

(10) Patent No.: US 7,201,240 B2
(45) Date of Patent: Apr. 10, 2007

(54) BIASED INSERT FOR INSTALLING DATA TRANSMISSION COMPONENTS IN DOWNHOLE DRILLING PIPE

(75) Inventors: David R. Hall, Provo, UT (US);
Michael A. Briscoe, Lehi, UT (US);
Kory K. Garner, Payson, UT (US);
Tyson J. Wilde, Spanish Fork, UT (US)

(73) Assignee: IntelliServ, Inc., Provo, UT (US)

( * ) Notice: Subject to any disclaimer, the term of this patent is extended or adjusted under 35 U.S.C. 154(b) by 182 days.

(21) Appl. No.: 10/710,639

(22) Filed: Jul. 27, 2004

(65) Prior Publication Data
US 2006/0021799 A1    Feb. 2, 2006

(51) Int. Cl.
*E21B 47/12*    (2006.01)
(52) U.S. Cl. .................. 175/320; 166/65.1; 340/855.1; 340/855.2; 439/194; 439/950
(58) Field of Classification Search ............... 166/65.1; 175/320; 340/854.9, 855.1, 855.2; 439/191, 439/192, 194, 950
See application file for complete search history.

(56) References Cited

U.S. PATENT DOCUMENTS

| | | | |
|---|---|---|---|
| 2,414,719 A | | 1/1947 | Cloud |
| 3,518,608 A | | 6/1970 | Papadopoulos |
| 3,518,609 A | * | 6/1970 | Fontenot, Jr. ............... 439/191 |
| 3,879,097 A | * | 4/1975 | Oertle ..................... 340/855.1 |
| 4,411,435 A | | 10/1983 | McStravick |
| 4,605,268 A | * | 8/1986 | Meador ..................... 439/194 |
| 4,739,325 A | | 4/1988 | MacLeod |
| 4,788,544 A | | 11/1988 | Howard |
| 5,275,246 A | | 1/1994 | Krasnov |
| 5,855,399 A | | 1/1999 | Profunser |
| 6,012,015 A | | 1/2000 | Tubel |
| 6,252,518 B1 | | 6/2001 | Laborde |
| 6,392,317 B1 | | 5/2002 | Hall et al. |
| 6,670,880 B1 | | 12/2003 | Hall et al. |
| 6,688,396 B2 | | 2/2004 | Floerke et al. |
| 6,717,501 B2 | | 4/2004 | Hall et al. |
| 6,799,632 B2 | | 10/2004 | Hall et al. |
| 6,821,147 B1 | | 11/2004 | Hall et al. |
| 6,830,467 B2 | | 12/2004 | Hall et al. |
| 6,844,498 B2 | | 1/2005 | Hall et al. |
| 6,866,306 B2 | | 3/2005 | Boyle et al. |

(Continued)

OTHER PUBLICATIONS

PCT/US 03/16476, Published Dec. 4, 2003, Applicant Baker Hughes; International Search Report: "Documents Considered to be Relevent".

*Primary Examiner*—Jennifer H. Gay
*Assistant Examiner*—Robert Fuller
(74) *Attorney, Agent, or Firm*—Jeffery E. Daly

(57) ABSTRACT

An apparatus for installing data transmission hardware in downhole tools includes an insert insertable into the box end or pin end of drill tool, such as a section of drill pipe. The insert typically includes a mount portion and a slide portion. A data transmission element is mounted in the slide portion of the insert. A biasing element is installed between the mount portion and the slide portion and is configured to create a bias between the slide portion and the mount portion. This biasing element is configured to compensate for varying tolerances encountered in different types of downhole tools. In selected embodiments, the biasing element is an elastomeric material, a spring, compressed gas, or a combination thereof.

16 Claims, 11 Drawing Sheets

U.S. PATENT DOCUMENTS

| | | |
|---|---|---|
| 6,888,473 B1 | 5/2005 | Hall et al. |
| 6,905,144 B2 | 6/2005 | Vila |
| 6,907,652 B1 | 6/2005 | Heijnen |
| 6,913,093 B2 | 7/2005 | Hall et al. |
| 6,929,287 B2 | 8/2005 | Flindall |
| 6,929,493 B2 | 8/2005 | Hall et al. |
| 6,945,802 B2 | 9/2005 | Hall et al. |
| 6,966,370 B2 | 11/2005 | Cook |
| 2004/0039466 A1 | 2/2004 | Lilly et al. |
| 2004/0104797 A1 | 6/2004 | Hall et al. |
| 2004/0113808 A1 | 6/2004 | Hall et al. |
| 2004/0145492 A1 | 7/2004 | Hall et al. |
| 2004/0150532 A1 | 8/2004 | Hall et al. |
| 2004/0164833 A1 | 8/2004 | Hall et al. |
| 2004/0164838 A1 | 8/2004 | Hall et al. |
| 2004/0216847 A1 | 11/2004 | Hall et al. |
| 2004/0244916 A1 | 12/2004 | Hall et al. |
| 2004/0244984 A1 | 12/2004 | Hall et al. |
| 2004/0246142 A1 | 12/2004 | Hall et al. |
| 2005/0001735 A1 | 1/2005 | Hall et al. |
| 2005/0001736 A1 | 1/2005 | Hall et al. |
| 2005/0001738 A1 | 1/2005 | Hall et al. |
| 2005/0035874 A1 | 2/2005 | Hall et al. |
| 2005/0035875 A1 | 2/2005 | Hall et al. |
| 2005/0035876 A1 | 2/2005 | Hall et al. |
| 2005/0036507 A1 | 2/2005 | Hall et al. |
| 2005/0039912 A1 | 2/2005 | Hall et al. |
| 2005/0045339 A1 | 3/2005 | Hall et al. |
| 2005/0046586 A1 | 3/2005 | Hall et al. |
| 2005/0046590 A1 | 3/2005 | Hall et al. |
| 2005/0067159 A1 | 3/2005 | Hall et al. |
| 2005/0070144 A1 | 3/2005 | Hall et al. |
| 2005/0082092 A1 | 4/2005 | Hall et al. |
| 2005/0092499 A1 | 5/2005 | Hall et al. |
| 2005/0093296 A1 | 5/2005 | Hall et al. |
| 2005/0095827 A1 | 5/2005 | Hall et al. |
| 2005/0115717 A1 | 6/2005 | Hall et al. |
| 2005/0145408 A1 | 7/2005 | Hall et al. |
| 2005/0150653 A1 | 7/2005 | Hall et al. |
| 2005/0161215 A1 | 7/2005 | Hall et al. |
| 2005/0173128 A1 | 8/2005 | Hall et al. |
| 2005/0212530 A1 | 9/2005 | Hall et al. |
| 2005/0236160 A1 | 10/2005 | Hall et al. |

* cited by examiner

BIASED INSERT FOR INSTALLING DATA TRANSMISSION COMPONENTS IN DOWNHOLE DRILLING PIPE

FEDERAL RESEARCH STATEMENT

This invention was made with government support under Contract No. DE-FC26-01NT41229 awarded by the U.S. Department of Energy. The government has certain rights in the invention.

BACKGROUND OF INVENTION

1. Field of the Invention

This invention relates to oil and gas drilling, and more particularly to apparatus and methods for installing high-speed networking components in downhole drilling strings.

2. Background of the Invention

The goal of accessing data from a drill string has been expressed for more than half a century. As exploration and drilling technology has improved, this goal has become more important in the industry for successful oil, gas, and geothermal well exploration and production. For example, to take advantage of the advances in the design of various tools and techniques for oil and gas exploration, it would be beneficial to have real time data such as temperature, pressure, inclination, salinity, etc. Several attempts have been made to devise a successful system for accessing such drill string data. However, due to the complexity, expense, and unreliability of such systems, many attempts to create such a system have failed to achieve significant commercial acceptance.

In U.S. Pat. No. 6,670,880 issued to Hall et al., the inventors disclosed a "downhole transmission system" that overcomes many of the problems and limitations of the prior art. In the Hall patent, data is transmitted along the drill string in real time. This is accomplished by various transmission hardware components integrated directly into the drill string. The Hall patent discloses apparatus and methods wherein various downhole tools and sensors communicate with surface equipment in real time.

Although the Hall patent describes technology that is applicable to drill pipe and other downhole tools that lack a "secondary shoulder" in the tool joint, the Hall technology is preferably used with "double-shouldered" pipe, namely drill pipe that has both a primary and secondary shoulder. Double-shouldered pipe is ideal because the secondary shoulder provides an ideal location for mounting data transmission hardware. The secondary shoulder is ideal because it receives significantly less make-up torque and stress than the primary shoulder and it also provides more protection to data transmission hardware than does the primary shoulder.

Nevertheless, the drilling industry continues to extensively use drill pipe that lacks a secondary shoulder. For example, many standard API (American Petroleum Institute) connections lack a secondary shoulder. This reality makes the mounting and implementation of data transmission hardware more challenging in these types of drill pipe.

Thus, what are needed are apparatus and methods for adapting the Hall technology, as well as other data transmission technologies, to work more effectively with other types and configurations of drill pipe, namely those that lack a primary and/or secondary shoulder. What are further needed are apparatus and methods for installing data transmission hardware in types of drill pipe having imprecise or inconsistent tolerances. Finally, what are needed are apparatus and methods for universally installing data transmission hardware in many different types of downhole pipe or downhole tools.

SUMMARY OF INVENTION

In view of the foregoing, the present invention relates to apparatus and methods for installing data communication hardware in many different types and configurations of drill tools, such as drill pipe. The present invention further relates to apparatus and methods for providing communication hardware that compensates for varying tolerances encountered in different types and configurations of downhole tools. The present invention further relates to apparatus and methods for retrofitting many downhole tools, such as sections of drill pipe, with data transmission hardware.

Consistent with the foregoing, and in accordance with the invention as embodied and broadly described herein, an apparatus for installing data transmission hardware in downhole tools is disclosed in one aspect of the present invention as including an insert for insertion into the box end or pin end of a section of drill pipe. The insert includes a mount portion and a slide portion. The mount portion is configured to mount to the box end or pin end of a downhole tools and the slide portion is configured to slide with respect to the mount portion. A data transmission element is typically mounted in the slide portion of the insert.

A biasing element is installed between the mount portion and the slide portion and is configured to create a bias between the slide portion and the mount portion. This biasing element is configured to compensate for varying tolerances encountered in different types of downhole tools. In selected embodiments, the biasing element is an elastomeric material, a spring, compressed gas, or a combination thereof. In certain embodiments, the insert further comprises a stop mechanism adapted to prevent the slide portion from sliding more than a specified distance with respect to the mount portion.

BRIEF DESCRIPTION OF DRAWINGS

The foregoing and other features of the present invention will become more fully apparent from the following description, taken in conjunction with the accompanying drawings. Understanding that these drawings depict only typical embodiments in accordance with the invention and are, therefore, not to be considered limiting of its scope, the invention will be described with additional specificity and detail through use of the accompanying drawings.

DETAILED DESCRIPTION

It will be readily understood that the components of the present invention, as generally described and illustrated in the Figures herein, could be arranged and designed in a wide variety of different configurations. Thus, the following more detailed description of embodiments of apparatus and methods of the present invention, as represented in the Figures, is not intended to limit the scope of the invention, as claimed, but is merely representative of various selected embodiments of the invention.

The illustrated embodiments of the invention will be best understood by reference to the drawings, wherein like parts are designated by like numerals throughout. Those of ordinary skill in the art will, of course, appreciate that various modifications to the apparatus and methods described herein may easily be made without departing from the essential characteristics of the invention, as described in connection with the Figures. Thus, the following description of the Figures is intended only by way of example, and simply illustrates certain selected embodiments consistent with the invention as claimed herein.

Figure 1:
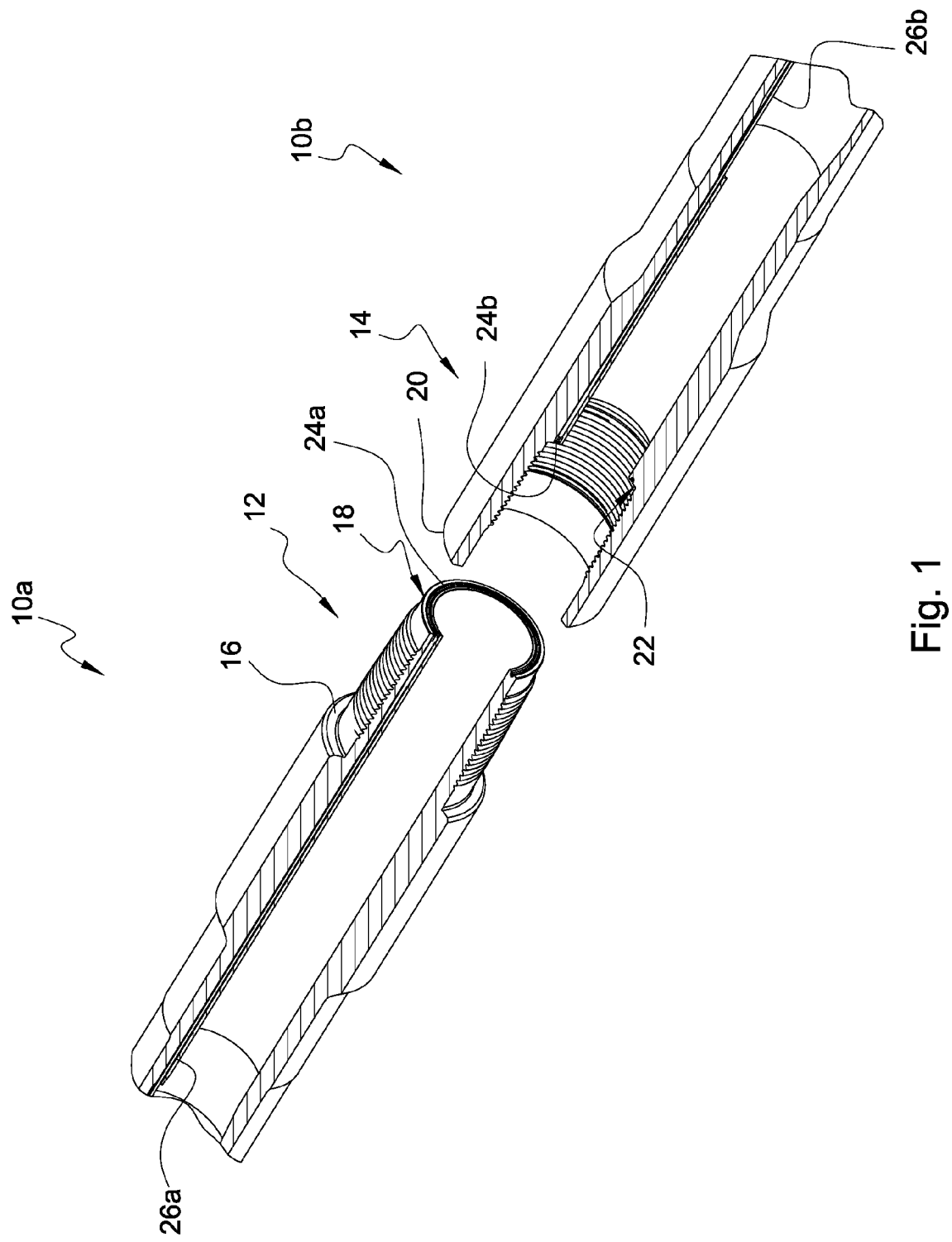
FIG. 1 is a cross-sectional perspective view illustrating one embodiment of transmission elements installed in the box end and pin end of sections of drill pipe, having primary and secondary shoulders, to transmit and receive information along a drill string.

Referring to FIG. 1, downhole components 10a, 10b such as drill pipes or other downhole tools may include a pin end 12 and a box end 14 to connect the downhole components 10a, 10b together. In certain embodiments, a pin end 12 may include an external threaded portion that screws into an internal threaded portion of the box end 14. When threading a pin end 12 into a corresponding box end 14, various shoulders may engage one another to provide structural support to the tool joint.

For example, in some types of downhole components 10, a pin end 12 may include a primary shoulder 16 and a secondary shoulder 18. Likewise, the box end 14 may include a corresponding primary shoulder 20 and secondary shoulder 22. Drill pipe that includes both a primary and secondary shoulder is often called "double shouldered" pipe.

A primary shoulder 16, 20 may be labeled as such to indicate that the primary shoulder 16, 20 provides the majority of the structural support to the joint between downhole components 10. Nevertheless, a secondary shoulder 18 may also engage a corresponding secondary shoulder 22 in the box end 14, providing additional support or strength to components 10 connected in series.

As was previously discussed, apparatus and methods are needed to transmit information along a string of connected components 10. As such, one major issue is the transmission of information across joints where a pin end 12 connects to a box end 14. In selected embodiments, a transmission element 24a may be mounted proximate a mating surface 18 or shoulder 18 on a pin end 12 to communicate information to another transmission element 24b located on a mating surface 22 or shoulder 22 of the box end 14. Cables 26a, 26b, or other transmission media 26a, 26b, may be operably connected to the transmission elements 24a, 24b to transmit information along the downhole components 10a, 10b.

In certain embodiments, an annular recess may be provided in the secondary shoulder 18 of the pin end 12 and in the secondary shoulder 22 of the box end 14 to house each of the transmission elements 24a, 24b. The transmission elements 24a, 24b may have an annular shape and be mounted around the radius of the shoulders 18, 22. Since a secondary shoulder 18 may contact or come very close to a secondary shoulder 22 of a box end 14, a transmission element 24a may sit substantially flush with a secondary shoulder 18 on the pin end 12. Likewise, a transmission element 24b may sit substantially flush with a surface of a secondary shoulder 22 of the box end 14.

In selected embodiments, a transmission element 24a may transmit data to a corresponding transmission element 24b through direct electrical contact therewith. In other embodiments, the transmission element 24a may convert an electrical signal to a magnetic field or magnetic current. A corresponding transmission element 24b, located proximate the transmission element 24a, may detect the magnetic field or current. The magnetic field may induce an electrical current in the transmission element 24b. This electrical current may then be transmitted from the transmission element 24b by way of an electrical cable 26b routed along the downhole component 10b.

As was previously stated, a downhole drilling environment may adversely affect communication between transmission elements 24a, 24b mounted on drill string components 10. Materials such as dirt, mud, rocks, lubricants, or other fluids, may inadvertently interfere with the contact or signal transmission between transmission elements 24a, 24b. In other embodiments, gaps present between a secondary shoulder 18 of the pin end 12 and a secondary shoulder 22 of the box end 14, due to variations in component tolerances, may interfere with communication between transmission elements 24a, 24b. Thus, apparatus and methods are needed to reliably overcome these as well as other obstacles.

Figure 2:
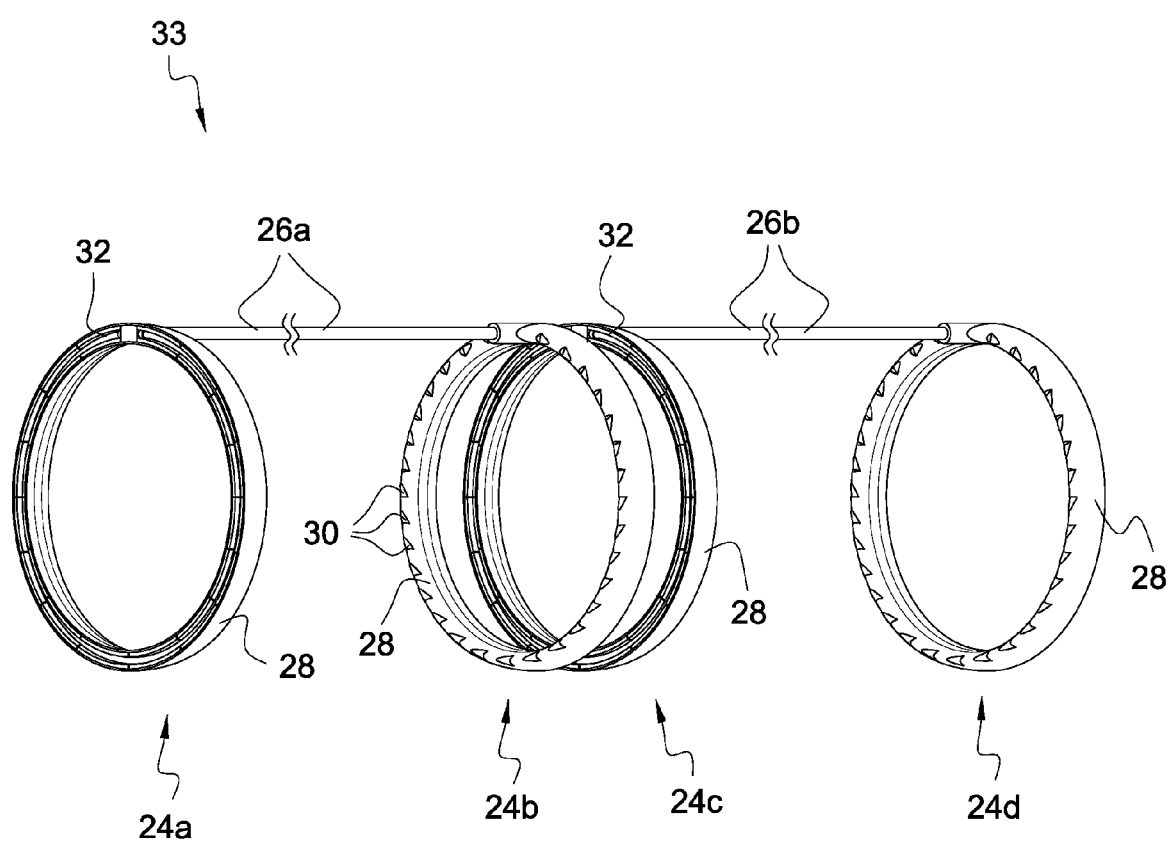
FIG. 2 is a perspective view illustrating one embodiment of the interconnection and interaction between transmission elements.

Referring to FIG. 2, in selected embodiments, a transmission element assembly 33 may include a first transmission element 24a mounted in the pin end 12 of a downhole component 10, and a second transmission element 24b mounted in the box end 14 of a downhole component 10. Each of these transmission elements 24a, 24b may be operably connected by a cable 26a, such as electrical wires, coaxial cable, optical fiber, or like transmission media. Each of the transmission elements 24 may include an exterior annular housing 28. The annular housing 28 may protect and retain components or elements within the transmission elements 24a, 24b, 24c, and 24d. The annular housing 28 may have an exterior surface shaped to conform to a recess milled, formed, or otherwise provided in the pin 12 or box end 14 of a downhole component 10.

In selected embodiments, the annular housing 28 may be surfaced to reduce or eliminate rotation of the transmission elements 24 within their respective recesses. For example, anti-rotation mechanisms, such as barbs 30 or other surface features formed on the exterior of the annular housing 28 may serve to reduce or eliminate rotation.

As is illustrated in FIG. 2, a transmission element 24b located on a first downhole component 10 may communicate with a transmission element 24c located on a second downhole component 10. Electrical current transmitted through a coil 32 in a first transmission element 24b may create a magnetic field circulating around the conductor 32. Transmission element 24c may be positioned proximate transmission element 24b such that the magnetic field is detected by a coil 32 in the transmission element 24c.

In accordance with the laws of electromagnetics, a magnetic field circulated through an electrically conductive loop induces an electrical current in the loop. Thus, an electrical signal transmitted to transmission element 24b may be replicated by transmission element 24c. Nevertheless, a certain amount of signal loss may occur as a signal is transmitted between the transmission elements 24b, 24c. For example, signal loss may be caused by air or other gaps present between the transmission elements 24b, 24c, or by the reluctance of selected magnetic materials. Thus, apparatus and methods are needed to reduce, as much as possible, signal loss that occurs between transmission elements 24b, 24c. This may be accomplished, in some instances, by minimizing the gap between the transmission elements 24b, 24c. This may improve the signal coupling as well as keep debris or other substances from being introduced between the transmission elements 24. Thus, apparatus and methods are needed to minimize, as much as possible, the gap between transmission elements 24b, 24c.

Figure 3:
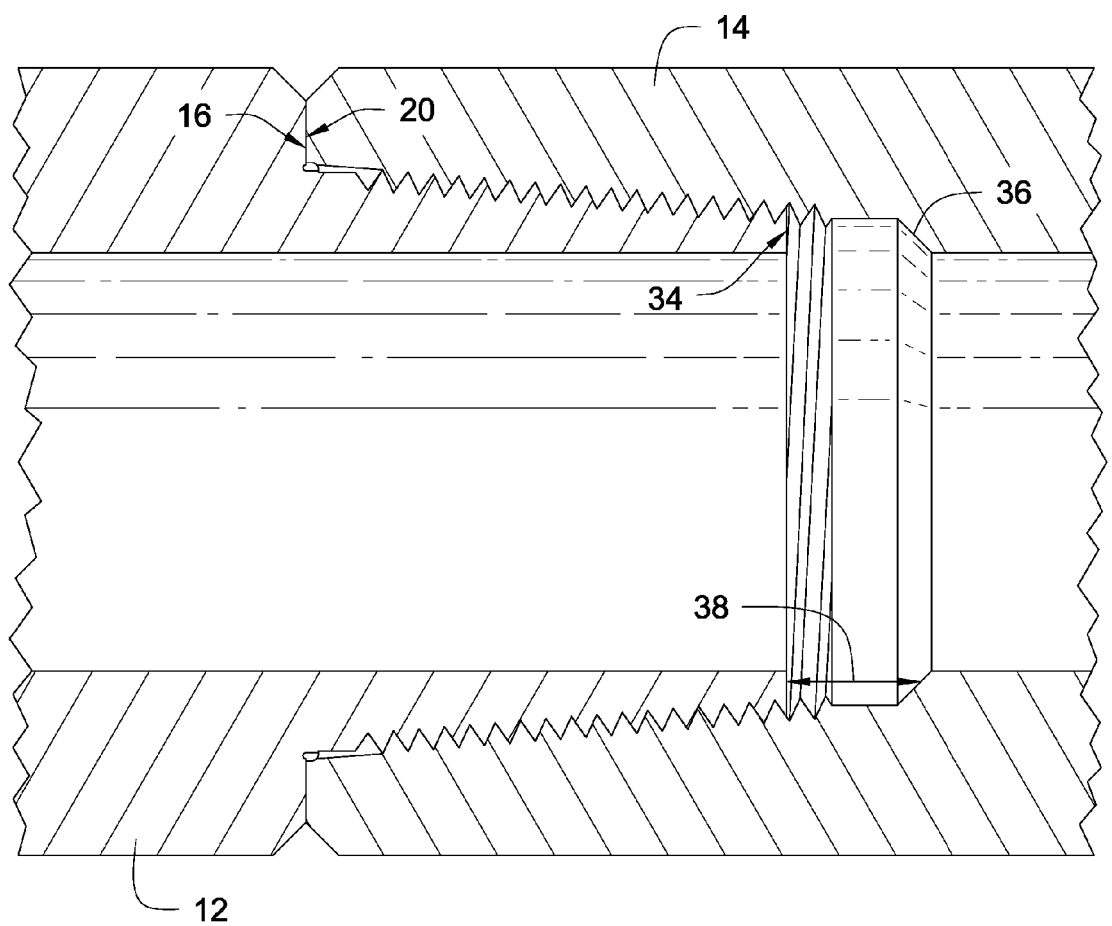
FIG. 3 is a cross-sectional view of one embodiment of a joint between two sections of drill pipe, such as two sections of API-standard drill pipe.

Referring to FIG. 3, although some types of drill pipe include a double shoulder (i.e., both a primary and secondary shoulder), many if not most types of drill pipe lack one or both shoulders. For example, many types of API (American Petroleum Institute) standard pipe lack a secondary shoulder. As a result, installing transmission elements 24 in this type of pipe may be problematic. Thus, apparatus and methods are needed to install reliable transmission elements 24 in non-shouldered pipe, or pipe that lacks a secondary shoulder.

For example, as is illustrated in FIG. 3, API standard pipe often includes primary shoulders 16, 20 that engage one another, but may lack mating secondary shoulders. As a result, even when fully threaded together, the shoulder 34 of the pin end 12 may not engage a corresponding shoulder 36 of the box end 14. Moreover, in many instances a shoulder 36 may be angled or curved and may arguably not be a shoulder 36 at all.

As a result, a gap 38 may be present between the shoulders 34, 36. Also, because the tolerances of different types of drill pipe vary significantly, the gap 38 may vary significantly even among sections of the same type or make of drill pipe. Therefore, apparatus and methods are needed to install transmission elements 24 and other data transmission hardware into various types of drill pipe while compensating for the varying tolerances and shoulder configurations that may be encountered in the drill pipe.

Figure 4:
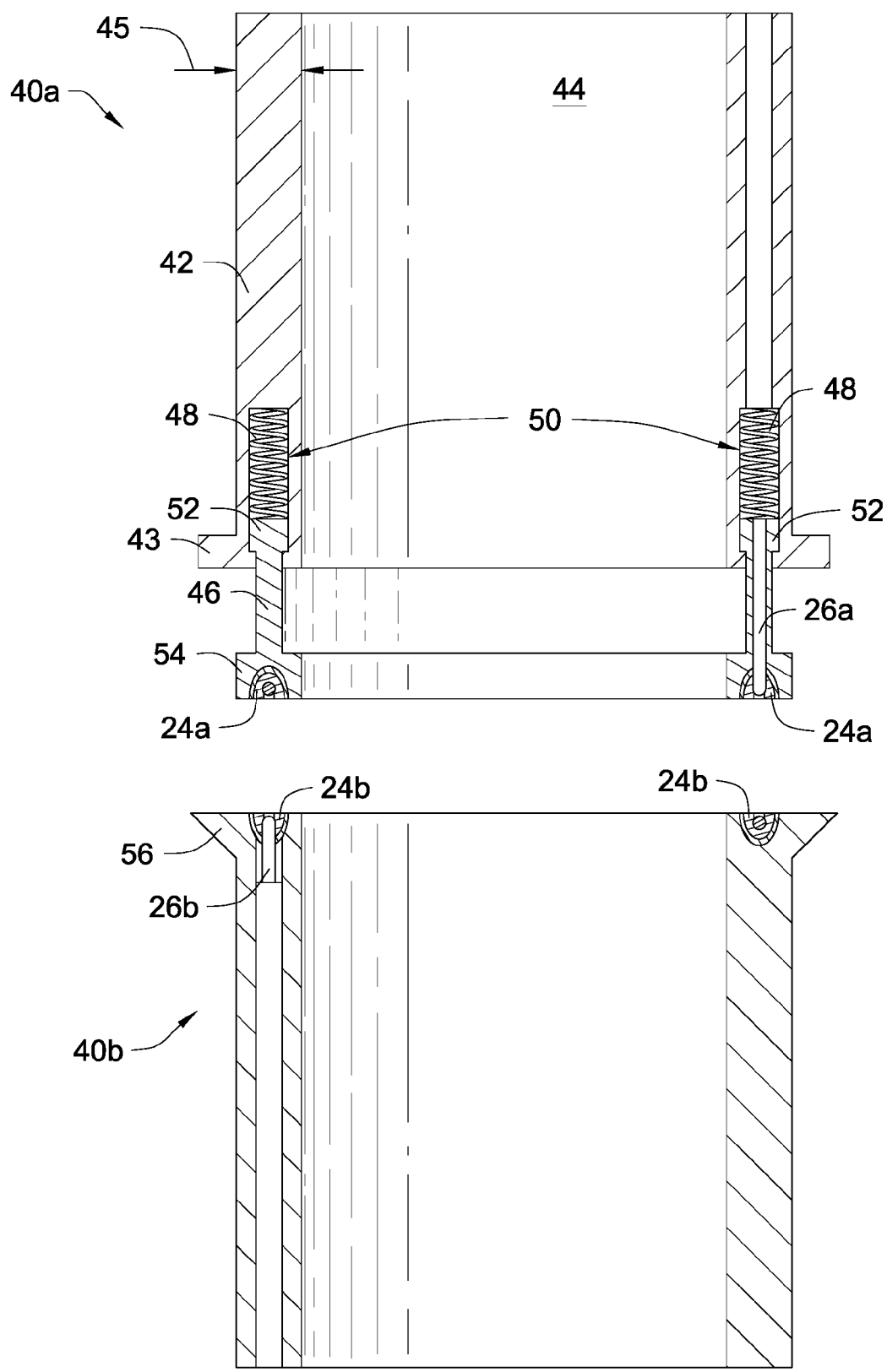
FIG. 4 is a cross-sectional view of one embodiment of a biased insert in accordance with the present invention.

Referring to FIG. 4, in selected embodiments, an insert 40a may include a mount portion 42 for installation or mounting to the box or pin end 12, 14 of a downhole component 10. In certain embodiments, the mount portion 42 may be insertable into the bore of a downhole component 10. In selected embodiments, the mount portion 42 may be dimensioned such that it fits snugly and securely within the inside diameter of a downhole component 10. In certain embodiments, the mount portion 42 may also include a flange 43 or other registration means 43 that contacts a shoulder or other feature of a downhole component 10 to keep the mount portion 42 properly aligned in a downhole component 10.

The mount portion 42 may be secured in the tool by welding, adhesive, fasteners, a press fit, or other attachment or registration means, as will be discussed with more specificity in FIGS. 9–11. The insert 40a may also include a central bore 44 to accommodate drilling mud, wireline tools, oil, gas, or other objects and substances passing through the drill string. Although the insert 40a may narrow the central bore of a drill string in certain embodiments, the insert wall 45 may be thin enough that it does not critically or excessively restrict the central bore.

The insert 40a may also include a slide portion 46 that slides with respect to the mount portion 42. The slide portion 46 may include a transmission element 24a. The transmission element 24a may or may not be accommodated in a recess provided in the slide portion 46. In selected embodiments, the transmission element 24a may transmit data by way of induction or direct contact like the transmission elements 24a, 24b described with respect to FIG. 1. Nevertheless, the transmission elements 24a, 24b may be any type of transmission element 24 capable of transmitting data across the tool joint, whether annular or not. The transmission element 24a may be connected to a cable 26a or other transmission means 26a for transmitting data along the drill string. This cable 26a may be routed through a channel formed in one or both of the slide portion 46 and the mount portion 42 before transmitting the data through the central bore of the downhole component 10.

One or more biasing elements 48, such as springs, elastomeric materials, compressed gases, resilient materials, or the like, may be inserted between the slide portion 46 and the mount portion 42. These biasing elements 48 may create a spring force between the slide portion 46 and the mount portion 42 when they are urged together. In selected embodiments, a recess 50 or other channel 50 may be milled, cast, or otherwise provided to accommodate one or several biasing elements 48. Likewise, in selected embodiments, the cable 26a may flex or bend when the biasing elements 48 are compressed to maintain a data link across the slide portion 46 and the mount portion 42.

In certain embodiments, a stop mechanism 52, such as a shoulder 52, may be provided to keep the slide portion 46 from completely disengaging from the mount portion 42, or to limit the travel of the slide portion 46 with respect to the mount portion 42. Likewise, the slide portion 46 may include a shoulder 54 or other registration means 54 to limit the travel of the slide portion 46 in the opposite direction.

In selected embodiments, a corresponding insert 40b may be provided to mate with the insert 40a. The insert 40b may include a transmission element 24b mounted in a surface thereof. The insert 40b may also include a shoulder 56 or registration means 56 shaped to fit the contour of the pin or box end 12, 14 of a downhole component 10. Although the shoulder 56 is angled in the illustrated example, the shoulder 56 may have any shape, as needed, to fit or conform to the inside shape of a downhole component 10, including a flat, angled, or curved shape. The insert 40b may also include a channel to accommodate a cable 26*b* or other transmission means 26*b*. Like the biased insert 40*a*, the insert 40*b* may be dimensioned such that it fits into the central bore of a downhole component 10, such as a section of drill pipe.

Because the quality of the communication or signal transmission of various types of transmission elements 24*a*, 24*b* is optimized by proximity or contact, the biased insert 40*a* may be effective at maintaining close proximity or contact between the transmission elements 24*a*, 24*b*, even in downhole tools of varying or inconsistent tolerances. The inserts 40*a*, 40*b* may also be effective to install transmission elements 24*a*, 24*b* in downhole tools that lack a secondary shoulder, as is illustrated in FIG. 3. In certain embodiments, the inserts 40*a*, 40*b* may be effective to retrofit existing pipe with transmission elements 24*a*, 24*b* and transmission cable 26 or other transmission means 26 along a downhole drilling string. This may allow large amounts of data to be transmitted along the drill string.

Figure 5A:
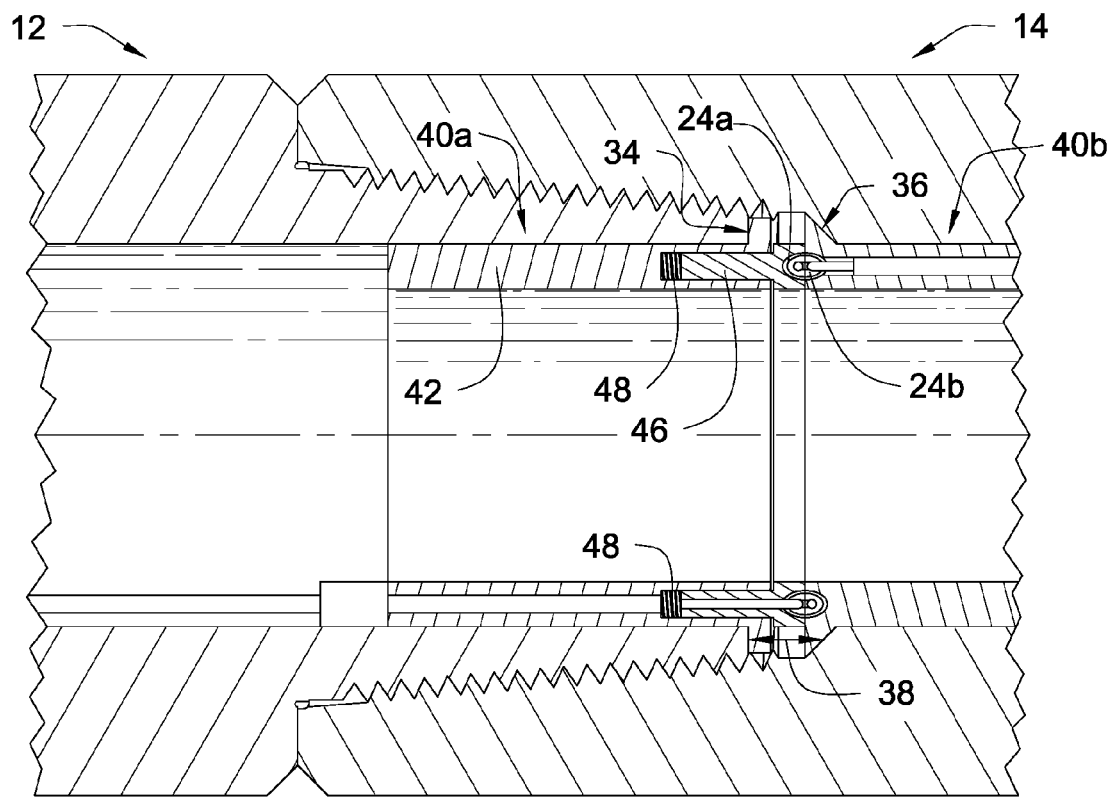
FIG. 5A is a cross-sectional view of one embodiment of a biased insert, using springs as biasing elements, installed in the pin end and box end of sections of drill pipe.

Referring to FIG. 5A, for example, a biased insert 40*a* may be installed in the pin end 12 of a drill component 10. Likewise, a corresponding insert 40*b* may be installed into the box end 14 of a drill component 10. In this example, the biased insert 40*a* utilizes biasing element 48 such as springs. When the pin end 12 is completely threaded into the box end 14, the springs may be almost completely compressed due to a gap 38 that exists between the internal shoulders 34, 36. Nevertheless, the biased insert 40*a* is able to compensate for the gap 38 by bringing the transmission elements 24*a*, 24*b* into contact or close proximity to one another. In selected embodiments, the transmission elements 24*a*, 24*b*, as well as the mating surfaces of the slide portion 46 and the insert 40*b* may be machined or otherwise smoothed so that upon mating, the surfaces may urge dirt, liquids, or other substances away from the joint.

Figure 5B:
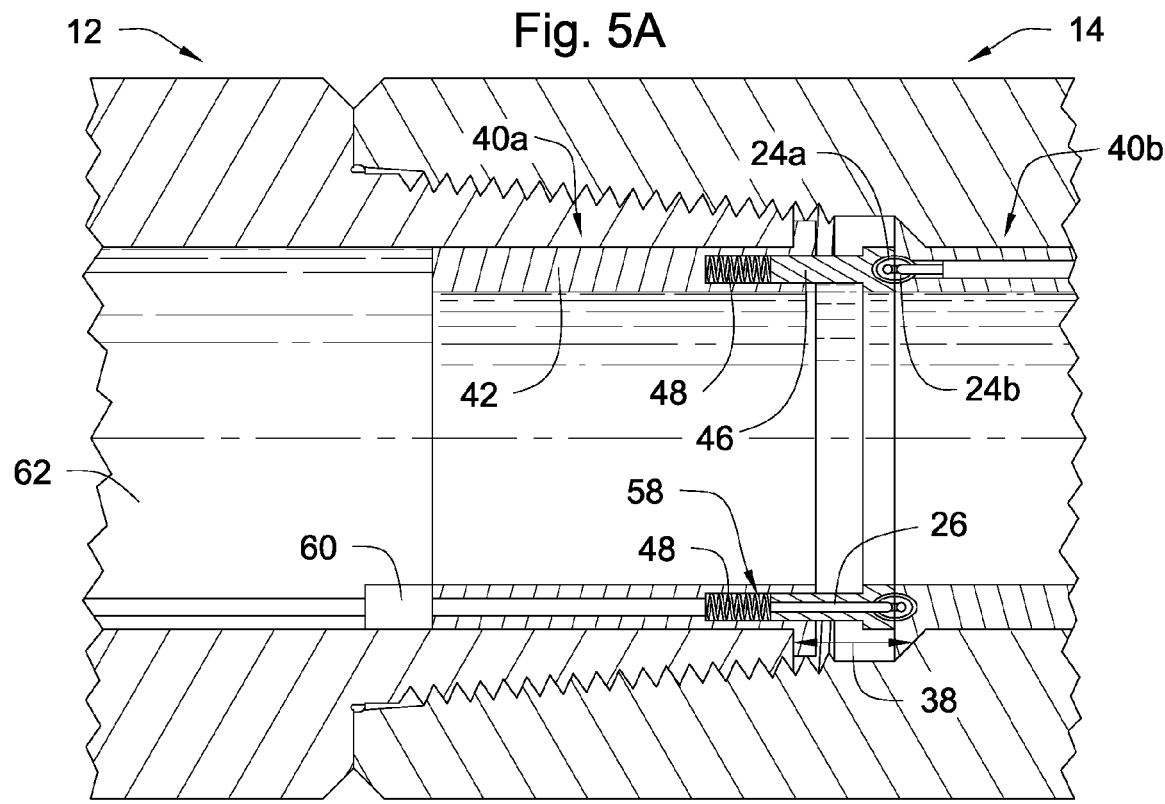
FIG. 5B is another view of the apparatus of FIG. 5B illustrating the movement and interaction of the biased insert.

Likewise, referring to FIG. 5B, in cases where the gap 38 is larger, the biased insert 40*a* may be able to compensate for the larger gap 38. As illustrated, the biasing elements 48 may urge the slide portion 46, and corresponding transmission element 24*a*, into contact or close proximity to the transmission element 24*b* mounted in the insert 40*b*. In selected embodiments, the cable 26 or other transmission media 26 may be routed through the springs. As the springs compress and expand, the cable 26 or other transmission media 26 may flex inside the springs or inside the space 58 between the mount portion 42 and the slide portion 46. In other embodiments, a spring may function both as a transmission medium 26 to transmit a data signal, as well as a biasing element 48. In certain embodiments, an interface 60 may provide an interface for a cable 26 or other transmission media 26 to transition from the insert 40*a* to the central bore 62 of a downhole component 10.

Figure 6A:
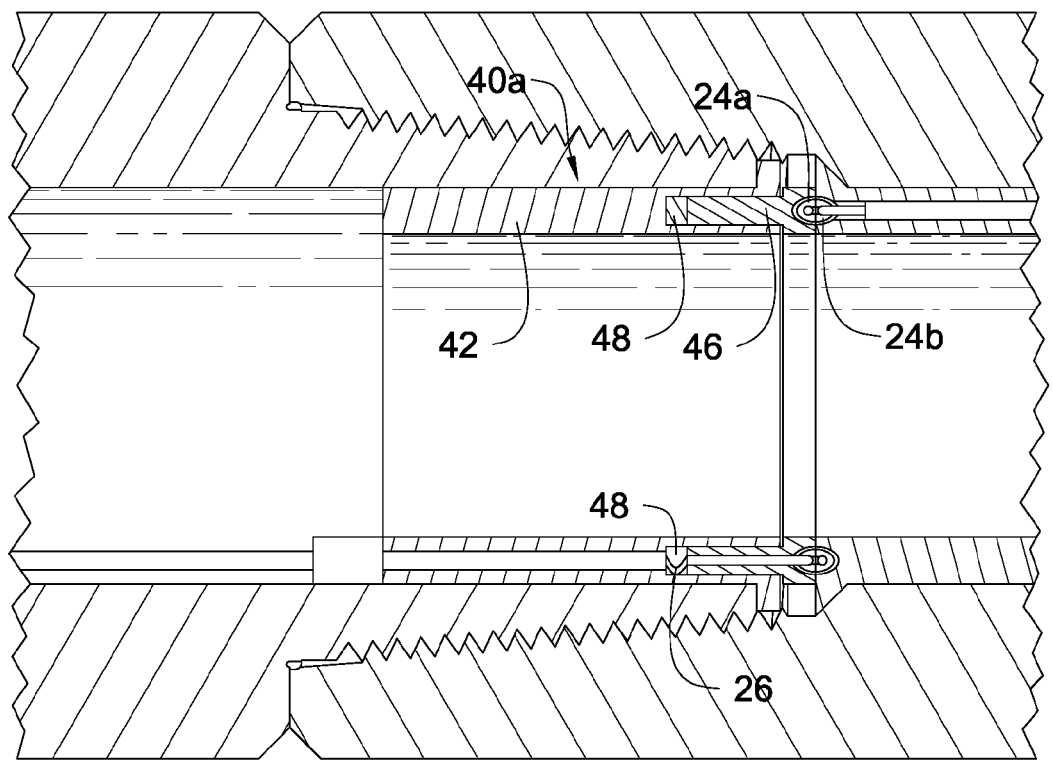
FIG. 6A is a cross-sectional view of one embodiment of a biased insert, using an elastomeric material as a biasing element, installed in the pin end and box end of sections of drill pipe.

Referring to FIG. 6A, in another embodiment, a biased insert 40*a* may use an biasing element 48 such as elastomeric material. The biasing element 48 may be constructed of any suitable elastomeric material and may be chosen to withstand downhole temperature, wear, vibration, corrosive substances, or the like. As the slide portion 46 is pushed into the mount portion 42, the elastomeric material may compress and urge the transmission element 24*a* against the corresponding transmission element 24*b*. As illustrated, the cable 26 may be optionally embedded within the elastomeric material and may flex or bend as the slide portion 46 is urged into the mount portion 42.

Figure 6B:
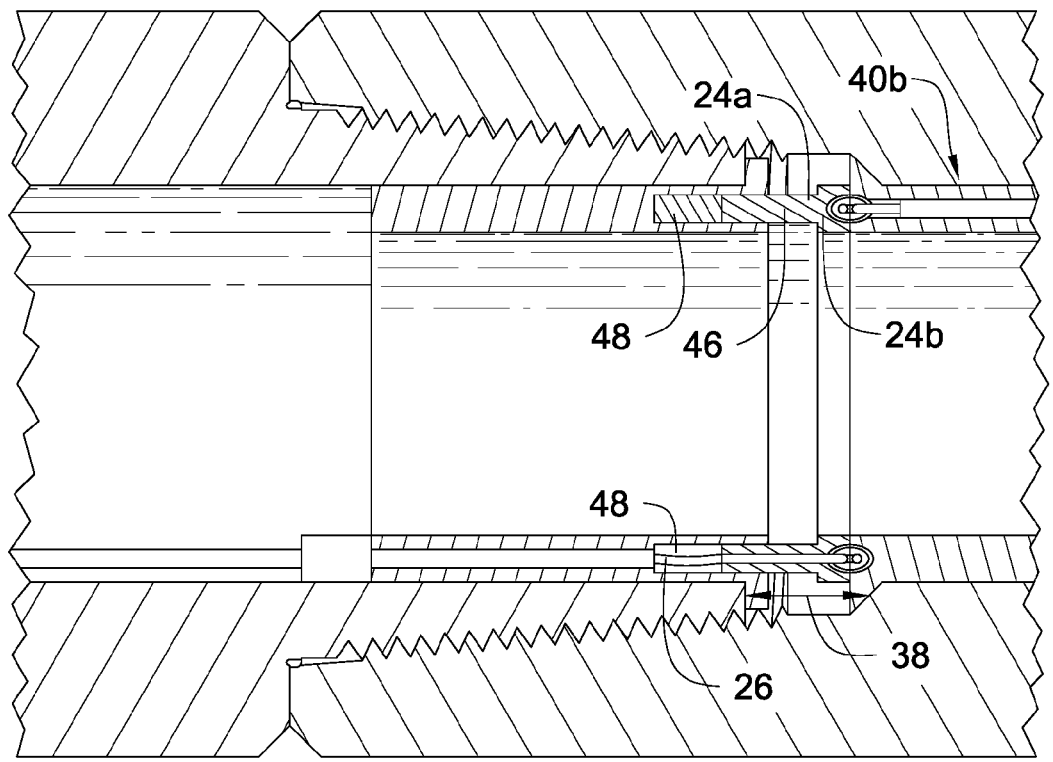
FIG. 6B is another view of the apparatus of FIG. 6A illustrating the movement and interaction of the biased insert.

Referring to FIG. 6B, likewise, in cases where the gap 38 is larger, the elastomeric material 48 may expand and urge the slide member 46 and corresponding transmission element 24*a* against the insert 40*b* and corresponding transmission element 24*b*. As the elastomeric material 48 expands, the cable 26 or other transmission media 26 may straighten to span the additional length.

Figure 7:
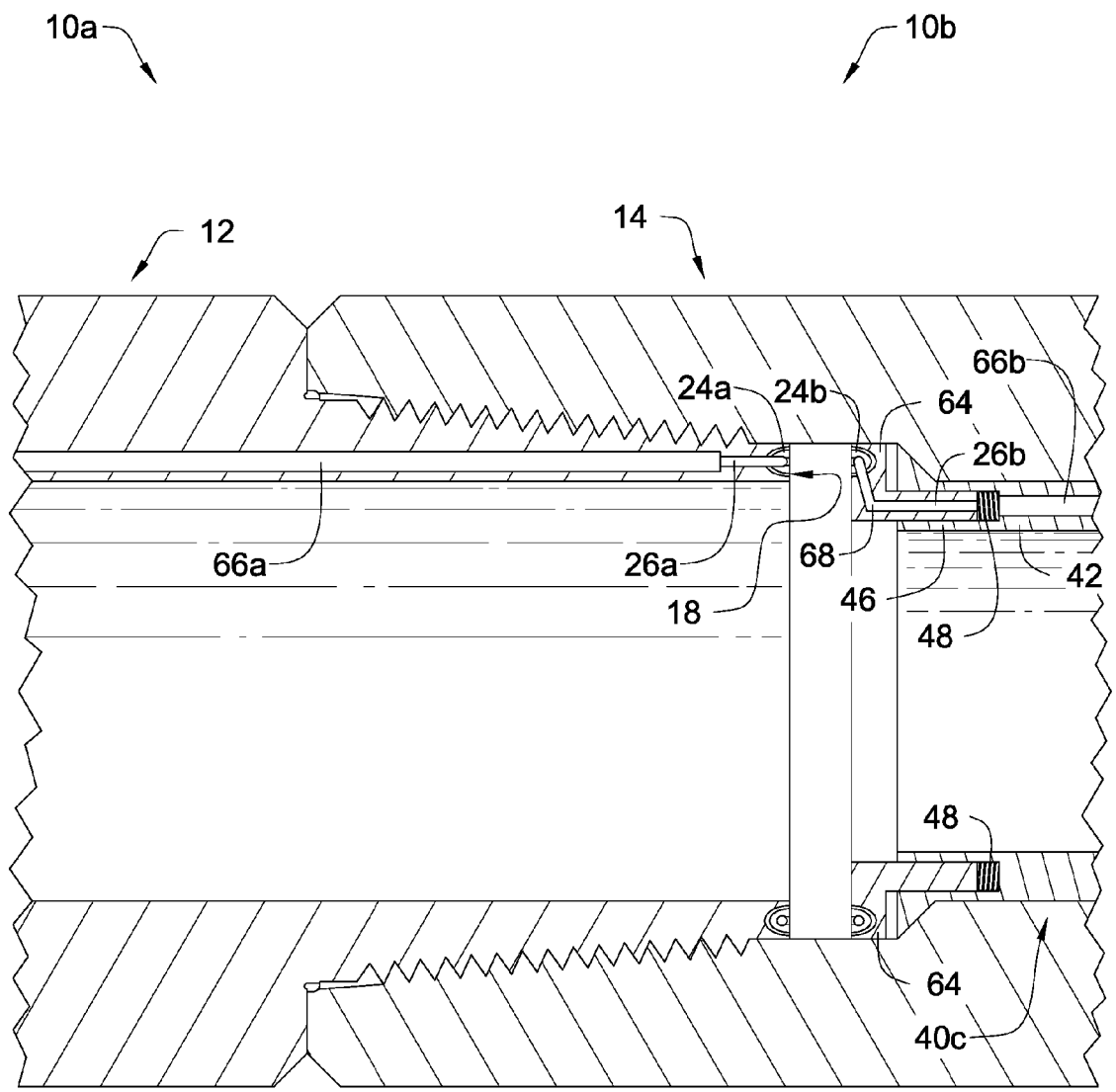
FIG. 7 is a cross-sectional view of one embodiment of a biased insert used to create a data transmission interface between the pin end of a section of drill pipe, having a secondary shoulder, and the box end of a section of drill pipe, lacking a secondary shoulder.

Referring to FIG. 7, in some cases, a biased insert 40*c* may be used to create a reliable connection between a transmission element 24*a* integrated into the wall of first downhole component 10*a*, and a transmission element 24*b* mounted in a second downhole component 10*b*. For example, in selected embodiments, the pin end 12 of a first downhole component 10*a* may already have a transmission element 24*a* integrated into a secondary shoulder 18 thereof, such as is illustrated in FIG. 1. Nevertheless, a second downhole component 10*b* may lack a secondary shoulder, such as is common in many API standard downhole tools. In such cases, a biased insert 40*c* may be used to install a transmission element 24*b* in the downhole component 10*b* and urge the transmission element 24*b* against the corresponding transmission element 24*a*. Like the previously mentioned examples, the biased insert 40*c* may include a mount portion 42, a slide portion 46, and one or more biasing elements 48. In selected embodiments, an offsetting flange 64 may be used to align the transmission elements 24*a*, 24*b*, since the paths 66*a*, 66*b* of the cables 26*a*, 26*b* may not align. In certain embodiments, the cable 26*b* may include a bend 68 to accommodate the offset of the flange 64.

Figure 8:
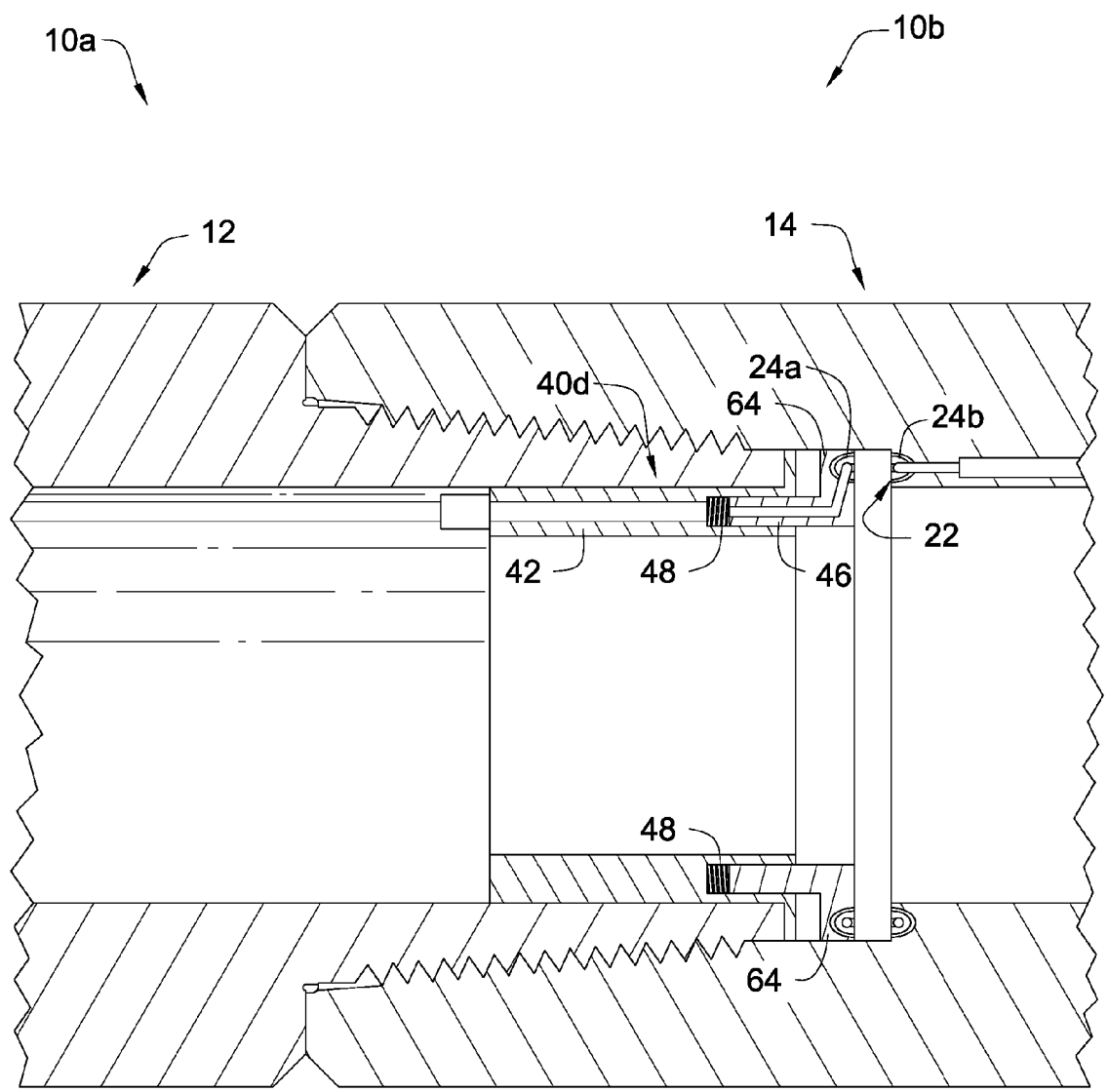
FIG. 8 is a cross-sectional view of one embodiment of a biased insert used to create a data transmission interface between the box end of a section of drill pipe, having a secondary shoulder, and the pin end of a section of drill pipe, lacking a secondary shoulder.

Referring to FIG. 8, in a similar manner, a biased insert 40*d* may be used to create a reliable connection between a transmission element 24*b* integrated into the wall of the box end 14 of a downhole component 10*b*, and a transmission element 24*a* mounted in an insert 40*d* installed in the pin end 12 of a second downhole component 10*a*. For example, similar to the previous example, the box end 14 of a first downhole component 10*b* may have a transmission element 24*b* integrated directly into a secondary shoulder 22 thereof, as is illustrated in FIG. 1. Nevertheless, the pin end 12 of a second downhole component 10*a* may lack a secondary shoulder, or the secondary shoulder may not contact the secondary shoulder 22 of the box end 14. In such cases, a biased insert 40*d* may be used to install a transmission element 24*a* in the pin end 12 to urge the transmission element 24*a* against a corresponding transmission element 24*b*. Like the previous example, the biased insert 40*d* may include a mount portion 42, a slide portion 46, one or more biasing elements 48, and an offsetting flange 64 to align the transmission elements 24*a*, 24*b*.

Figure 9:
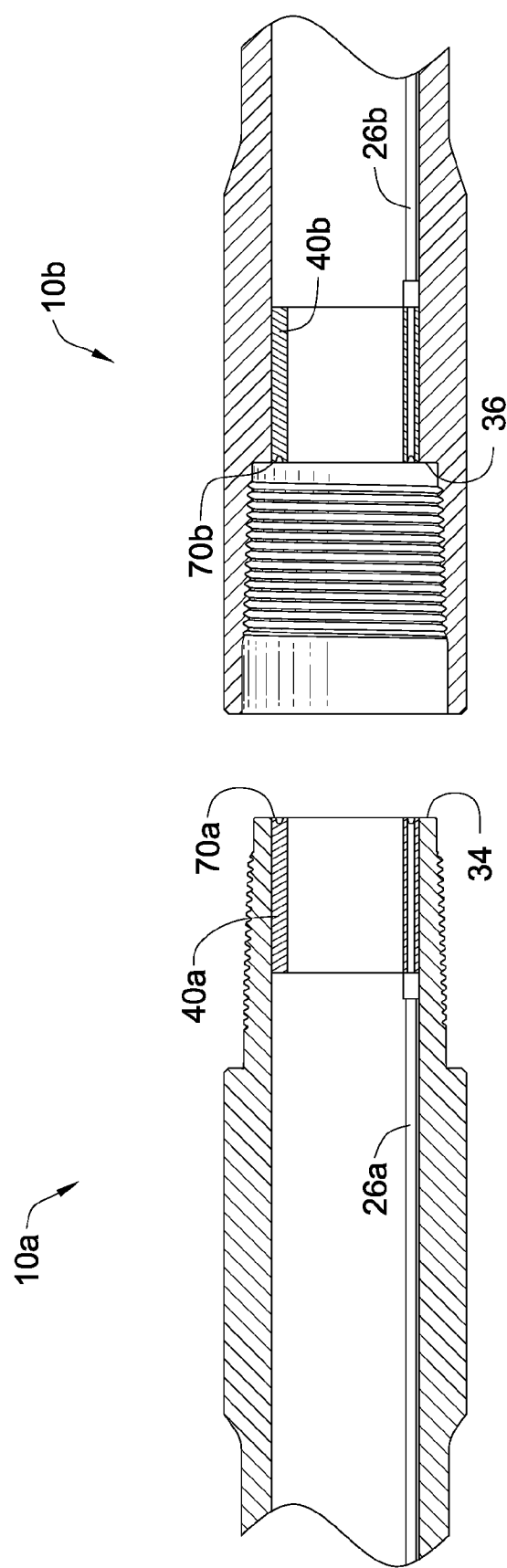
FIG. 9 is a cross-sectional view illustrating one embodiment of inserts secured inside the pipe using a press fit, welding, or an adhesive, such as an epoxy.

Referring to FIG. 9, various different techniques may be used to mount, attach, or install biased or other inserts 40*a*, 40*b* into downhole components 10*a*, 10*b*. For example, in selected embodiments, inserts 40*a*, 40*b* may be installed in downhole components 10*a*, 10*b* using a press-fit or an adhesive, such as an epoxy. The surfaces of the inserts 40*a*, 40*b* and inside diameters of the downhole components 10 may optionally be roughened or otherwise textured to provide a stronger bond between the inserts 40*a*, 40*b* and downhole components 10*a*, 10*b*. Cables 26*a*, 26*b* may then be attached to the inserts 40*a*, 40*b*. In some embodiments, tension provided by the cables may help to secure the inserts within the downhole components 10*a*, 10*b*. The mating surfaces 70*a*, 70*b* of the inserts 40*a*, 40*b* may optionally sit flush with the shoulders 34, 36 of the downhole components 10*a*, 10*b*, since the press-fit or adhesive may provide most of the bonding strength between the inserts 40*a*, 40*b* and the components 10*a*, 10*b*. Flush surfaces 70*a*, 70*b* may also be desirable in embodiments where there is insufficient space for a flange or lip within the tool joint, or in cases where a flange may interfere with the tool joint.

Figure 10:
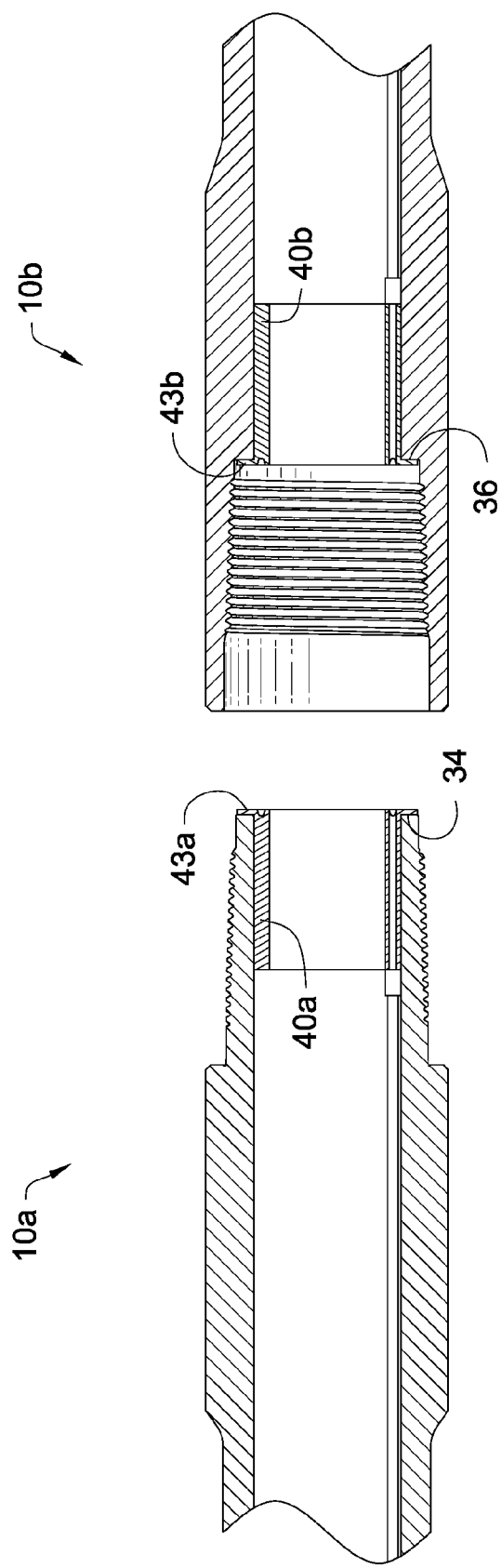
FIG. 10 is a cross-sectional view illustrating one embodiment of inserts using flanges to maintain proper alignment or registration of the inserts with respect to the drill pipe.

Referring to FIG. 10, in another embodiment, the inserts 40a, 40b may include flanges 43a, 43b, or other registration means 43a, 43b, that sit against or contact a physical feature of the downhole components 10a, 10b, such as the shoulders 34, 36. The flanges 43a, 43b may provide an additional surface to bond to the shoulders 34, 36, but may also provide reliable means for aligning the inserts 40a, 40b with the downhole components 10a, 10b. In other embodiments, the flanged inserts 40a, 40b may not be adhered to the downhole components 10a, 10b at all, but may be installed and removed, as desired.

Figure 11:
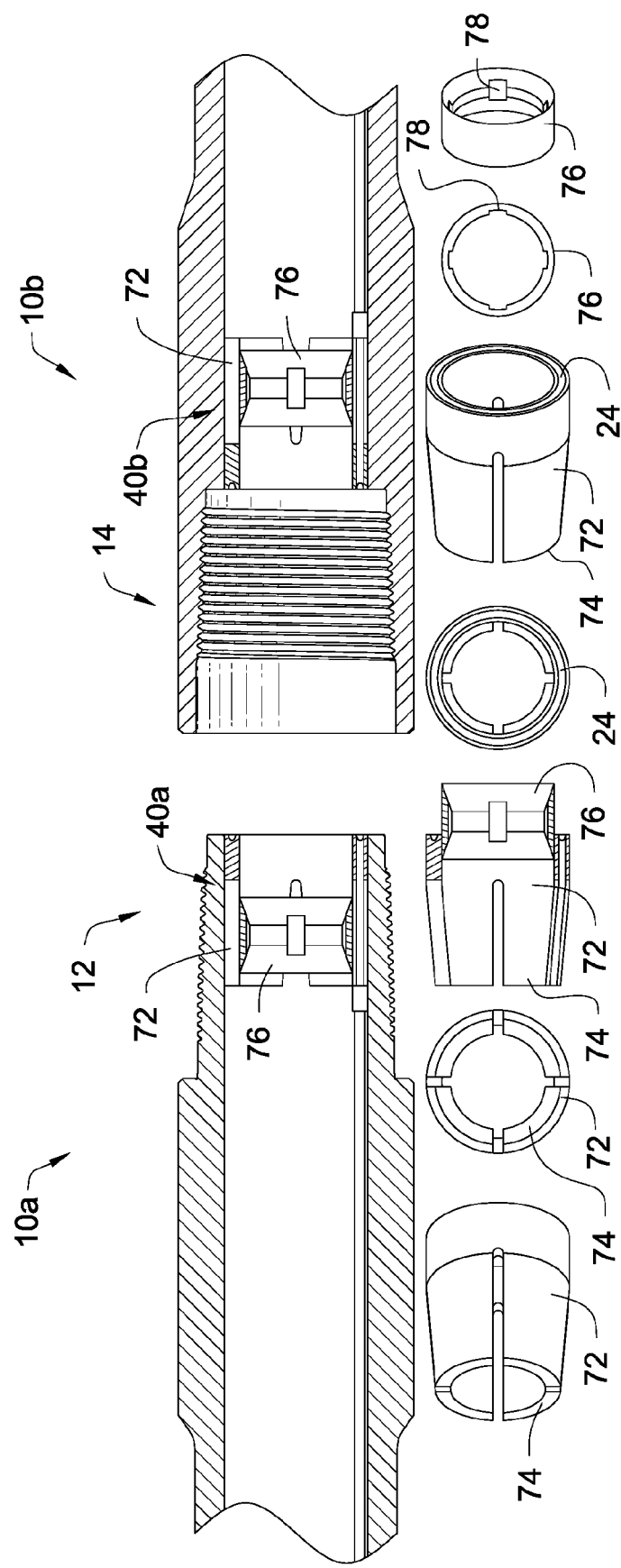
FIG. 11 is a cross-sectional view of another embodiment of inserts that may be inserted and secured by expanding the inserts within the inside diameter of the drill pipe.

Referring to FIG. 11, in yet another embodiment, removable inserts 40a, 40b may be installed in the pin end 12 and box end 14 of downhole components 10a, 10b. The removable inserts 40a, 40b may provide various advantages of the inserts 40a, 40b described in FIG. 9, as well as other advantages of the inserts 40a, 40b described in FIG. 10. For example, the inserts 40a, 40b described in FIG. 11 may have the advantage that they are removable. However, the inserts 40a, 40b may not require flanges, as illustrated in FIG. 10, which may potentially interfere with the tool joint.

Various profile, perspective, and cross-sectional views of one contemplated embodiment of removable inserts 40a, 40b are illustrated in FIG. 11. For example, the removable inserts 40a, 40b may include an expandable body 72 having a tapered end 74 that includes one or several gaps to allow for expansion. The expandable body 72 may house a transmission element 24 for transmitting data across the tool joint. An expansion ring 76 may be inserted into the expandable body 72 to expand the tapered end 74 of the body 72 against the inside diameters of downhole components 10a, 10b. To remove the inserts 40a, 40b, the expansion ring 76 is removed from the expandable body 72 and the body 72 is removed from the components 10a, 10b. In selected embodiments, the outside diameter of the expansion ring 76 and the inside diameter of the expandable body 72 are threaded. The expandable body 72 is then expanded within the inside diameter of the components 10a, 10b, by screwing the expansion ring 76 into the expandable body 72. In selected embodiments, a tool is used to screw the expansion ring 76 into the expandable body 72 by engaging one or more notches 78. Although the mount portion 42, slide portion 46, and biasing members 48 are not illustrated in FIGS. 9–11 to simplify the illustrations, these elements may be integrated into the inserts 40a, 40b described in FIGS. 9–11.

The present invention may be embodied in other specific forms without departing from its essence or essential characteristics. The described embodiments are to be considered in all respects only as illustrative, and not restrictive. The scope of the invention is, therefore, indicated by the appended claims, rather than by the foregoing description. All changes within the meaning and range of equivalency of the claims are to be embraced within their scope.

The invention claimed is:

1. An apparatus for retrofitting a section of drill pipe with a transmission line, the apparatus comprising:
    an insert for insertion into at least one of the box end and the pin end of a section of drill pipe, wherein the insert comprises a mount portion and a slide portion;
    a transmission element mounted in the slide portion; and
    a plurality of biasing elements for effecting a bias between the mount portion and the slide portion;
    wherein the insert is inserted into the inside diameter of a section of drill pipe and narrows a central bore of the drill pipe;
    wherein the plurality of biasing elements are located between the slide and mounting portions and are diametrically opposed from one another.

2. The apparatus of claim 1, further comprising a channel traveling through at least one of the slide portion and the mount portion to accommodate a transmission line.

3. The apparatus of claim 2, further comprising a transmission line routed through the channel, wherein the transmission line is configured to flex when the slide portion slides with respect to the mount portion.

4. The apparatus of claim 1, wherein the plurality of biasing elements is selected from the group consisting of an elastomeric material, a spring, and compressed gas.

5. The apparatus of claim 1, wherein: the slide portion is substantially cylindrical in shape; and the slide portion is characterized by an annular mating surface configured to contact a corresponding annular mating surface.

6. The apparatus of claim 5, wherein: the transmission element is substantially annular; and the transmission element is mounted in the annular mating surface.

7. The apparatus of claim 1, further comprising a stop mechanism adapted to prevent the slide portion from sliding more than a specified distance with respect to the mount portion.

8. The apparatus of claim 1, wherein the insert is smoothed.

9. The apparatus of claim 1, wherein the insert comprises a flange adapted to sit against a shoulder of the drill pipe.

10. The apparatus of claim 1, wherein the insert is radially expandable.

11. The apparatus of claim 1, wherein the insert comprises a tapered end that includes one of more gaps to allow for expansion.

12. An apparatus for retrofitting a section of drill pipe with a transmission line, the apparatus comprising:
    a pin end insert comprising a first transmission element, wherein the pin end insert is insertable into an inner diameter of the pin end of a section of drill pipe and narrows a central bore of the drill pipe; and
    a box end insert comprising a second transmission element,
    wherein the box end insert is insertable into a shoulder of the box end of a section of drill pipe;
    at least one of the pin end insert and the box end insert further comprises a mount portion and a slide portion wherein the apparatus comprises a plurality of biasing elements diametrically opposed from one another between the slide and mounting portions.

13. The apparatus of claim 12, wherein the plurality of biasing elements effect a bias between the mount portion and the slide portion.

14. The apparatus of claim 12, wherein at least one of the first and second transmission elements is mounted to the slide portion.

15. The apparatus of claim 12, further comprising a channel traveling through at least one of the slide portion and the mount portion to accommodate a transmission line.

16. The apparatus of claim 15, further comprising a transmission line routed through the channel, wherein the transmission line is configured to flex when the slide portion slides with respect to the mount portion.

* * * * *